(12) United States Patent
Corrado et al.

(10) Patent No.: US 7,295,108 B2
(45) Date of Patent: Nov. 13, 2007

(54) ACTIVE RFID TAG UTILIZING A SECONDARY COMMUNICATION MODE

(75) Inventors: Anthony P. Corrado, Evergreen, CO (US); Rex Logan, Superior, CO (US)

(73) Assignee: Symx Systems, Inc., Miami, FL (US)

( * ) Notice: Subject to any disclaimer, the term of this patent is extended or adjusted under 35 U.S.C. 154(b) by 131 days.

(21) Appl. No.: 11/082,327

(22) Filed: Mar. 17, 2005

(65) Prior Publication Data
US 2005/0206503 A1 Sep. 22, 2005

Related U.S. Application Data

(60) Provisional application No. 60/555,153, filed on Mar. 22, 2004.

(51) Int. Cl.
G08B 1/08 (2006.01)
(52) U.S. Cl. .............. 340/539.22; 340/5.92; 340/10.1; 340/10.51; 340/572.1
(58) Field of Classification Search ............ 340/572.1, 340/572.4, 505, 10.1, 5.92, 539.22, 539.26, 340/10.51, 10.41; 235/385; 705/28
See application file for complete search history.

(56) References Cited

U.S. PATENT DOCUMENTS

| | | | |
|---|---|---|---|
| 5,640,144 A * | 6/1997 | Russo et al. ............. 340/568.1 |
| 5,742,914 A * | 4/1998 | Hagenbuch ................... 701/35 |
| 5,774,876 A * | 6/1998 | Woolley et al. ................ 705/28 |
| 6,104,295 A | 8/2000 | Gaisser et al. |
| 6,154,139 A | 11/2000 | Heller |
| 6,211,790 B1 | 4/2001 | Radomsky et al. |
| 6,493,649 B1 * | 12/2002 | Jones et al. .................. 702/150 |
| 6,614,721 B2 * | 9/2003 | Bokhour ................ 340/825.49 |
| 6,765,484 B2 | 7/2004 | Eagleson et al. |
| 6,838,992 B2 | 1/2005 | Tenarvitz |
| 2003/0227386 A1* | 12/2003 | Pulkkinen et al. ........ 340/573.1 |
| 2005/0040241 A1* | 2/2005 | Raskar ........................ 235/385 |
| 2006/0065489 A1* | 3/2006 | Oh et al. ...................... 187/284 |

* cited by examiner

Primary Examiner—Thomas Mullen
(74) Attorney, Agent, or Firm—Jacques M. Dufin, Esq.; Innovation Law Group, Ltd.

(57) ABSTRACT

Embodiments of the present invention relate to methods and systems for radio frequency identification. According to one embodiment, a radio frequency identification system comprises a radio frequency identification tag. The tag comprises a radio frequency transmitter and an optical receiver. A reader is communicatively coupled with the tag and is adapted to receive information from the radio frequency identification tag via the radio frequency transmitter of the radio frequency identification tag. The system also includes a trigger communicatively coupled with the tag. The trigger is adapted to send information to the radio frequency identification tag via the optical receiver of the radio frequency identification tag.

22 Claims, 8 Drawing Sheets

ACTIVE RFID TAG UTILIZING A SECONDARY COMMUNICATION MODE

RELATED APPLICATION

This application claims the benefit of U.S. Provisional Application No. 60/555,153 filed Mar. 22, 2004, which is incorporated herein by reference.

FIELD OF THE INVENTION

The invention relates generally to the field of Radio Frequency Identification (RFID) tags and systems. More particularly, the invention relates to RFID tags that utilize a combination of radio frequency (RF) signals and localized secondary communication modes.

BACKGROUND

Radio Frequency Identification (RFID) applications are proliferating as the economies of automated tracking and identification are being realized by the global community. RFID is the ability to detect, read, and/or write data to tags that are affixed to "things." Cost of the RFID tag is the predominant parameter dictating applicability of this technology.

There are several categories of RFID tags and readers in use and proposed. The technology currently is predominantly passive. Passive implies that the tags have no battery. They derive power from a reader that transmits electromagnetic energy to the tag, which in turn reflects or modulates the energy signal back to the reader. While passive tags and readers are relatively inexpensive, they have severe limitations dictated by physics. For example, passive tags and readers have a limited range (from 0.1 cm to 6 meters) and are non-operational when blocked or shielded by metal objects, liquids and certain solid materials. In such systems, data rates are limited to approximate 6 mph "drive-thru" speeds thru portals, conveyors, etc. Further, passive systems have limited data storage capacity and no sensing capability.

There are also "active" tags that derive their power from incorporated batteries. Such devices add significant value to the process of inventory tracking and In Transit Visibility (ITV) enabling processes such as Total Asset Visibility (TAV). Relative to passive tags, active tags have a greater data acquisition range (0 to 100 meters). Active tags have the ability to provide Real Time Location System (RTLS) effectivity, to automatically provide theft deterrence thru continuous and automatic "presence detecting," and to enable tracking through processes such as manufacturing, shipping, on trucks, forklift transfer, and warehousing. A disadvantage of active tags is that they cost more than passive tags and this requires that these tags achieve maximum performance, add value to supply chain management and achieve these goals with absolute lowest cost.

Many active tags simply "beacon" or periodically transmit data. However, this approach has limitations. In certain instances, the continuous battery consumption is prohibitive since RF data transfer is only required when handling or processing the tagged items. In addition, it is often desired to associate a specific tagged item with a process such that the tagged item can be associated with a specific event, time or operator and beacon tags do not provide this utility. It is often desired to locate a specific tagged item in a situation where many identical items are tagged. It may be desired to be able to change the tag's mode of operation, i.e. turn the beacon mode "off or on", or change the beaconing rate. A specific tag should be able to respond under any of these circumstances. The ability to transfer data from the tag via a medium other than RF signals is also a desirable functionality since many locales and operations (such as aircraft flight) require RF silence.

Therefore, current commercial tags offer secondary triggering or communication modes of operation. "Triggering" is the remotely transmitted command to a tag directing that it execute a function such as "transmit RF, store data, or take a sensor reading". These secondary modes are restricted to the use of magnetic or RF fields to effect the triggering or communication. RF and magnetic triggered tags have the problem of being non-discriminatory, that is, the nature of RF fields is that they cannot be restrained to a narrow effective Field of View (FOV) and hence are not tag specific in the presence of many tags. They are also costly.

Low frequencies (magnetic domain) such as 125-134 KHz require very close proximity to actuate the tag response and often will not work with the tag attached to ferrous objects. Higher frequencies such as 915 MHz also are affected by metal items and are often reflected making single tag actuation less reliable than is required. All of these triggering mechanisms are large, bulky, and expensive. Handheld triggers or communicators are also large and bulky. Many applications require that the tags and readers comply with Intrinsic Safety requirements. This task is significantly complicated and more costly with low frequency devices due to the necessity for relatively high source power. Additionally, the transfer of data is at relatively low speeds.

SUMMARY

In accordance with the present invention, the above and other problems are solved by a low cost, active Radio Frequency Identification (RFID) tag having a Radio Frequency (RF) mode for transmitted signals coupled with an optical or ultrasonic secondary mode of communication and/or triggering. This combination of dual mode communications allows long range and autonomous tracking of objects to be realized through the RF transmit mode while providing the local communication (transfer) of data simultaneously through the secondary mode of communication. The ability to communicate through optical or ultrasonic secondary mode means that radio silence can be maintained (such as when on aircraft) while the total tag functionality of data transfer can be accomplished through the secondary mode. It also means that a tag can be triggered to transmit the RF signal on a discriminatory basis.

Another aspect of the present invention relates to methods and systems for transferring data wirelessly that eliminates the requirement for a resonator or other accurate time reference to control the timing of the input or output data pulse train. Elimination of this control element permits the RFID tag to operate with its associated reader in the presence of temperature induced variations in the control timing.

Embodiments of the invention may be implemented as a computer process, a computing system or as an article of manufacture such as a computer program product or computer readable media. The computer program product may be a computer storage medium readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

One aspect of the present invention relates to a low cost Radio Frequency Identification (RFID) tag having a Radio Frequency (RF) mode for transmitted signals coupled with an optical or ultrasonic secondary mode of communication and/or triggering. This combination of dual mode communications allows long range and autonomous tracking of objects to be performed through the RF transmit mode while allowing the local communication (transfer) of data to be performed simultaneously through the secondary mode of communication. The ability to communicate through optical or ultrasonic modes means that radio silence can be maintained (such as when on aircraft) while the total tag functionality and data transfer can be accomplished through the secondary mode. It also means that a tag can be triggered to transmit the RF signal on a discriminatory basis of individual tags.

Most RFID systems utilize additional infrastructure such as fixed readers to affect operation. The ability to utilize existing infrastructure equipment such as mobile computers to affect the data exchange is a significant cost reduction enabling the use of active tags. The RFID tags of this invention can function with existing mobile computers or PDAs.

Figure 1:
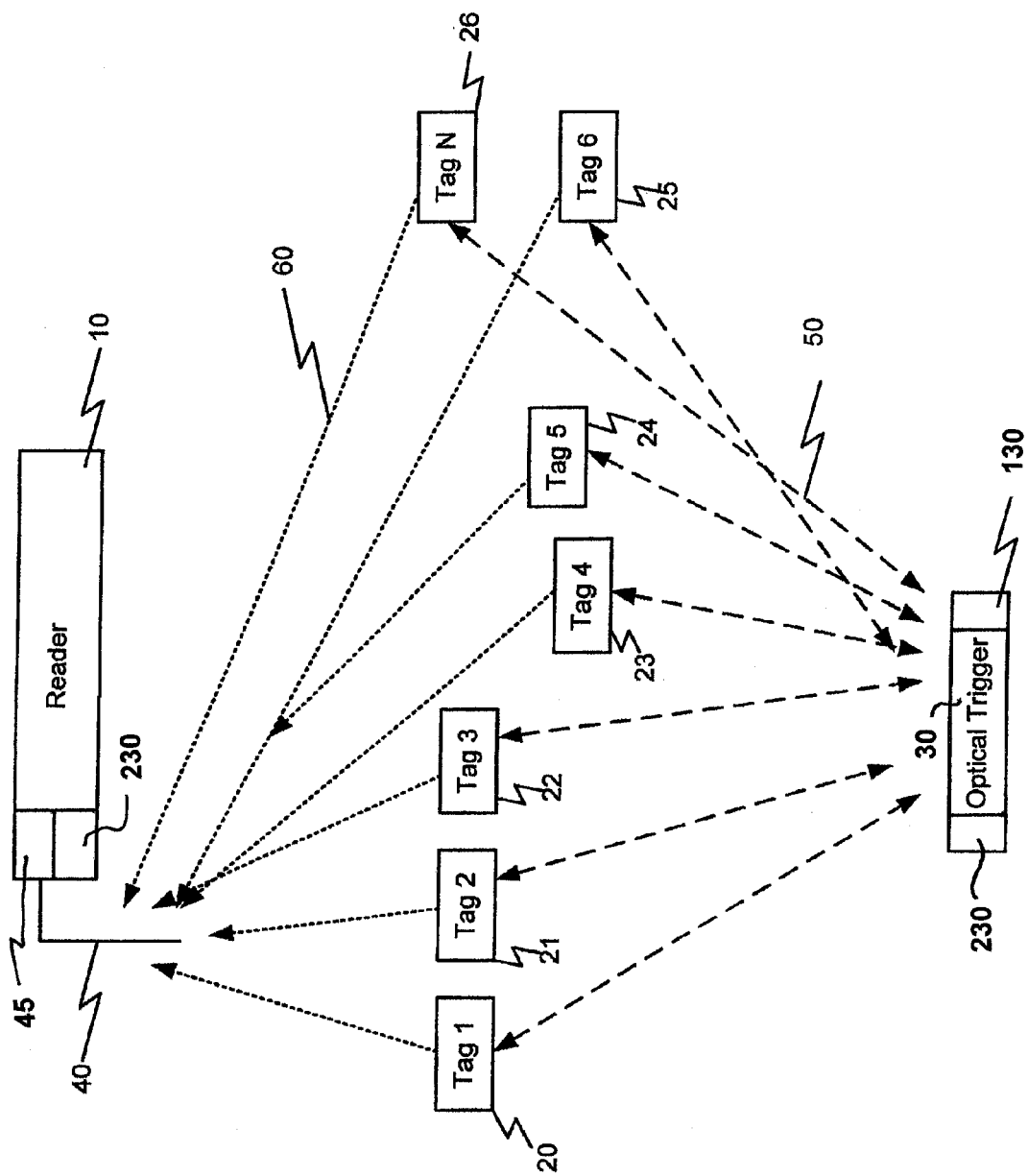
FIG. 1 is a high-level depiction of elements comprising an exemplary system of tags, handheld triggers/readers and fixed readers according to one embodiment of the present invention.

FIG. 1 is an overview of elements that can comprise a dual communication RFID system according to one embodiment of the present invention. The system in this example comprises a number of tags 20-26, optical triggers 30 and readers (RF receivers, infra-red transceivers) 10 with an antenna 40. Readers are defined herein as devices that receive RF and/or optical signals and transmit either RF or optical signals and which process these signals. As noted above, triggers and readers can be implemented as specialized equipment or as mobile computers, PDAs, or other types of devices. As described herein, a dual mode RFID tag is a device that is battery powered and is attached to objects. The tag has two communication modes, a bi-directional optical or ultrasonic mode and an RF mode. The tag can used to identify the object to which it is attached and also can store information that can be retrieved by either the optical or RF modes of operation. The tag can be used for item tracking, status, identification, location, presence, environmental sensing or data storage.

In the exemplary case the tags 20-26, readers 10, and triggers 30 each possess dual modes of operation. That is, they can have bi-directional optical and/or ultrasonic modes and at least receive or transmit RF modes of operation. The readers 10 also have bi-directional RF capability including multi-frequency modes of operation. In an exemplary embodiment, the optical frequency domain can be infra-red (IR) between 1-100 microns wavelengths. While FIG. 1 illustrates, and the following discussion describes, an optical trigger 30, optical communications, etc., it should be understood that an ultrasonic mode of communication is also contemplated as a secondary communication mode and may be used instead of or in addition to an optical mode of communication.

The tags 20-26, as will be discussed in greater detail below, can be equipped with receivers and transmitters enabling optical and/or ultrasonic transceiver operation that can effect bi-directional optical and/or ultrasonic modes of communication 50. The tags 20-26 can also transmit signals through the embedded RF mode of communication 60 to the readers 10 or triggers 30. The triggers 30 and readers 10 can be fixed or handheld mobile devices.

According to one embodiment of the present invention, the tags 20-26 can have several modes of operation including, but not limited to, autonomous transmit, commanded receive and/or transmit, store data, gather sensor data, provide visual responses and more. The tags 20-26 can provide a mode of operation in which they act autonomously to transmit an RF signal periodically on a pre-selected timing basis. They can also be commanded to transmit stored data via either the optical or RF modes of operation. The tags 20-26 can transmit (either optically, RE or both) whenever they are in the presence of an optical communication command signal. The triggers 30 and readers 10 can transmit "bulk" signals to all tags 20-26 in their respective fields of view (FOV) or they can transmit commands to a specific tag by way of unique tag ID values or stored data values. They can also transmit to a single tag in close proximity without the "command" signal being received by an adjacent tag.

The commands, in the exemplary embodiment, cause a tag to transmit both its unique identification value (ID)value along with the ID value of the causative communication device, i.e., trigger 30, via the RF or optical/ultrasonic modes 60,50 to readers 10, thus enabling individual tags and communication devices to be both identified and correlated. The infra-red (optical) or ultrasonic modes of communication 50 can also be utilized to transmit data and/or commands to and from the tags 20-26. These commands include, but are not limited to, anti-collision RF algorithms, "search for" parameters, mode changes, etc. Such communications can be stored as data on the tag 20-26 and transmitted via the RF mode 60 as required. The optical/ultrasonic modes may be initiated by triggers 30 in the form of either handheld or fixed devices in relative proximity to the tags 20-2 6, typically 0-10 meters in range, and (1) cause data to be stored on the tags 20-26 or (2) cause the tag to transmit certain data via the RF mode 60 or (3) transfer data through the optical/ultrasonic communication mode 50 or (4) transfer command and control information to the tags 20-26. By reducing the transmitted power of the optical device, communications can be reduced to a distance of several centimeters, thus communications can be restricted to a single tag even in the presence of multiple tags.

This local triggering of the RF signal provides the ability to distinguish a single RFID tagged device from a plethora of similar devices that may be in the general vicinity. It also enables the tagged item ID to be associated with the ID of the triggering device, such as in processing stations or during delivery for issue and receipt functionality. It is an inexpensive and reliable method of transferring data or commanding an alternate tag mode of operation. The exemplary infra-red mode can utilize both a unique protocol as well as using the IrDA industry open standard protocol. This latter attribute enables existing devices such as Personal Digital Assistants (PDAs) or mobile computers to affect the bi-directional transfer of data, i.e., to be used as a trigger 30. The RF signal can be received locally by a handheld mobile computer or it can be received by fixed readers that, in turn, relay the data back to a central computer data base. The optical signal does not require direct line of sight as it can be reflected off of most surfaces and this "multi bounce" signal has sufficient energy to effect tag triggering. The infra-red signal can penetrate clothing, paper and opaque solid surfaces.

As an illustrative example of this application, consider a processing operation in which hundreds of tagged items are present and are periodically transmitting, or beaconing, their ID and/or data which is received by reader devices, processed and transmitted to a database for additional processing or displayed for operator action or knowledge. This function enables automated inventory to be established, for instance. When a particular tagged item is to be processed, for instance, when a high pressure gas bottle is to be filled with a specific gas, the equipment or operator should be able to identify the specific ID of the container so the container ID and fill material can be correlated. The localized, secondary mode of communication described above, i.e., the optical or ultrasonic mode, allows that specific triggering to be affected. This same individual tag triggering can be used during deliveries when a driver identifies which specific tagged item is being dropped off ("issued") or picked up ("receipted").

Figure 2A:
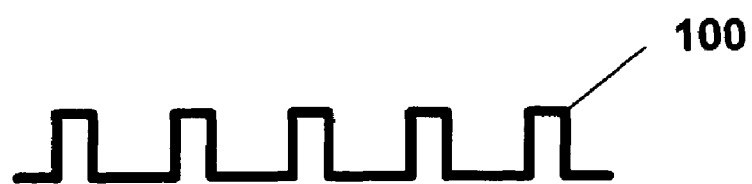
FIGS. 2A-2C are illustrations of the modes of signal functionality between the various elements of the system illustrated in FIG. 1.
Figure 2B:
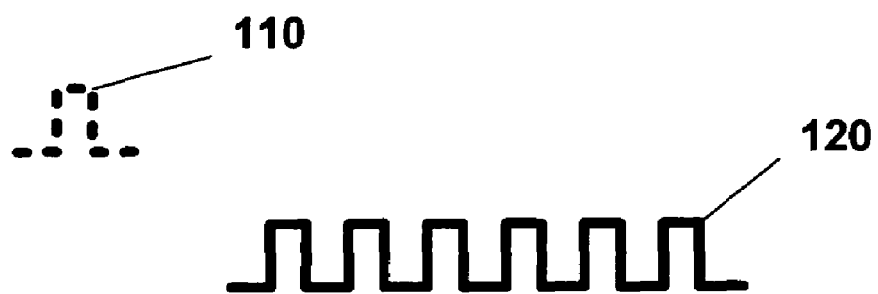
Figure 2C:
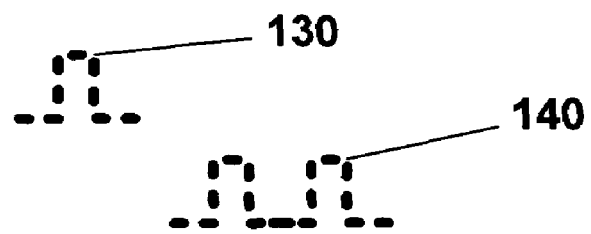

FIGS. 2A-2C are overviews of the primary modes of signal transfer between elements of the system illustrated in FIG. 1. FIG. 2A illustrates Mode 1 wherein the periodicity of the periodic RF transmission 100 (beacon mode) of which the tag is capable is shown. In this mode the tag repeats an RF output signal 100 according to parameters that may be determined and set into the tag pre-programmed at the manufacture, or transmitted optically to the tag. FIG. 2B illustrates Mode 2 wherein the RF output 120 is triggered from a direct command from the optical or ultrasonic trigger signal 110. In this mode of operation the tag decodes the incoming optical or ultrasonic signal 110 and transmits an RF signal 120 as commanded by this optical or ultrasonic input signal 110. This transmitted output signal 110 could be RF or optical (or ultrasonic) or both and could include specific stored data as well as the ID of the tag and trigger device. FIG. 2C illustrates Mode 3 wherein the optical or ultrasonic input signals to the tag 130 trigger an optical or ultrasonic only response 140 to be transmitted.

Figure 3:
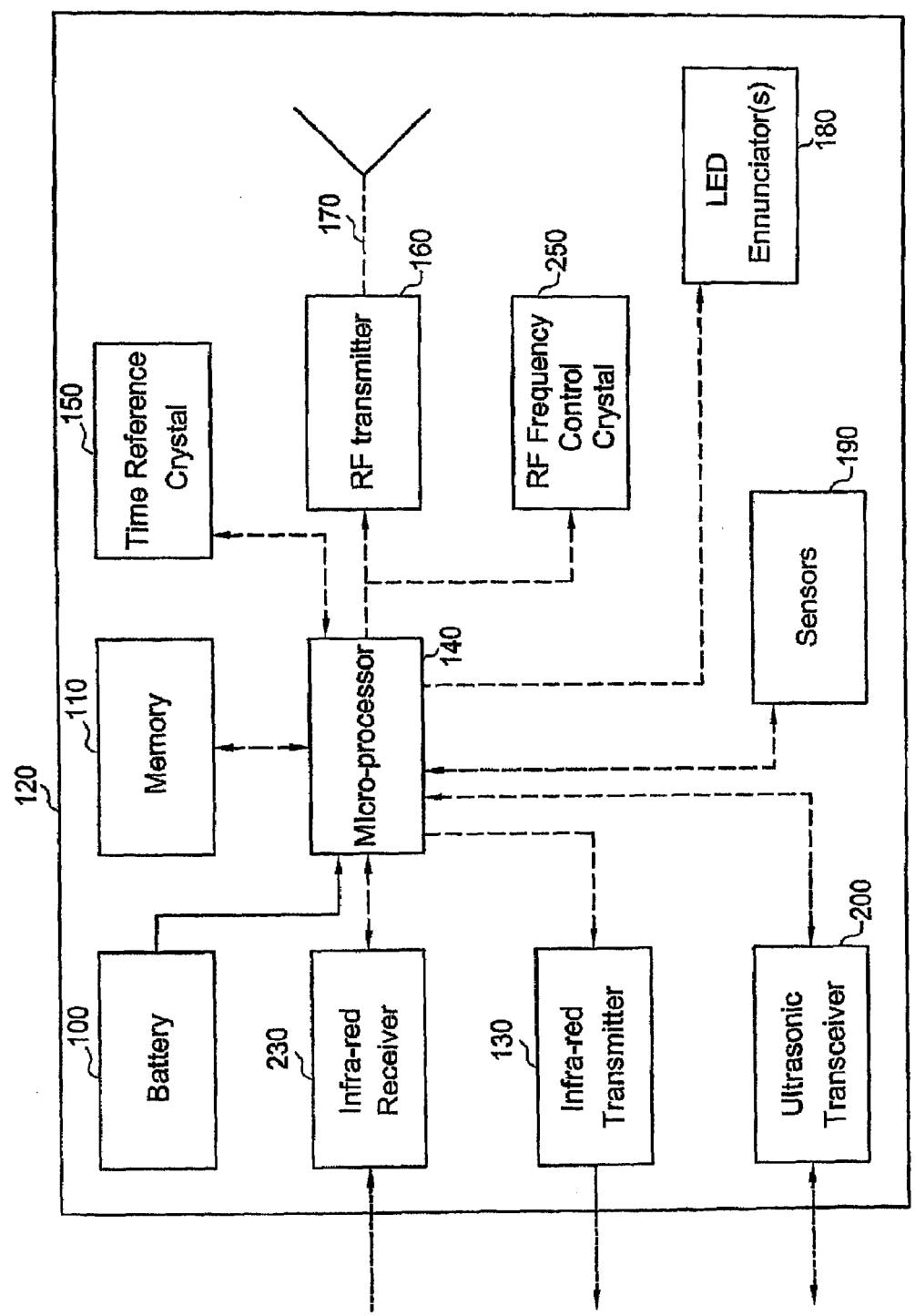
FIG. 3 is a block diagram of an exemplary embodiment of the tag portion of the system illustrated in FIG. 1.

FIG. 3 is a block diagram of an exemplary embodiment of a dual communication mode tag. The system can include an optical (infra-red in this example) transmissive case 120, an optional UltraSonic (US)transducer/transceiver 200, and/or optical receiver 230 and an optional optical transmitter 130 and, a battery power supply 100, a microprocessor 140, and an RF transmitter 160. While the optical transmitter 130 may be considered to be optional, by adding the infra-red transmitter 130 to the tag, the tag is then enabled with bi-directional, rather than unidirectional, optical communications. Optionally, the tag can also incorporate additional memory and sensors as will be discussed below.

In the preferred embodiment, the case 120 is molded of optical transparent materials so as to encapsulate the entire tag. Thus, the case 120 can provide mechanical, environmental, and enhanced Intrinsic Safety attributes. The case 120 can be molded of an optical transparent plastic which enables the optical (infra-red in the exemplary embodiment) signals to pass thru in a bi-directional manner with low loss. The US transceiver 200, if any, can be mounted on the external surface of the case 120 such that signals are generated and received in free air. Alternatively, the case can be molded onto the US transceiver 200 to maintain an environmentally sealed case design. The ultrasonic transceiver 200 can be used in lieu of or in addition to the IR transmitter 130 and receiver 230. Visible output pulses from one or more optional colored LED enunciators 180 also can be seen through this case 120 to indicate a current state or functions of the tag.

Power from the battery 100 is shown as a solid line between the battery 100 and the microprocessor 140 as it is, typically, continuously supplied to the microprocessor 140. The microprocessor 140 can maintain a continuous mode of operation to receive the optical signals and to control the periodic operations of the tag. Power can be gated by the microprocessor 140 to the various other tag elements as appropriate.

The microprocessor 140 executes instructions stored in memory internal to the microprocessor 140 or in the external memory 110. These instructions cause the microprocessor to control the operations of the tag and perform the functions described herein. The microprocessor 140 can have several modes of operation to conserve power regardless of the functionality incorporated. For example, it may have a "sleep" mode wherein only the internal clock is continuously powered. This clock can be used to calculate predefined time periods during which additional functionality may be enabled. These time periods are controllable through the optical input mode of operation.

When data is received by the tag, the data can be stored in either the internal memory of the microprocessor 140 or in the optional external memory 110. Since the microprocessor 140 contains built in memory, the external memory 110 may be incorporated when the data storage requirements exceed the on-board microprocessor memory capability. According to one embodiment of the present invention, the memory 110 can be written to via the optical mode of operation and data stored in it can be selectively retrieved either through the optical mode or through the RF mode.

Additional sensors 190, can be incorporated for sensing parameters including, but not limited to, temperature, g-shock, strain, humidity, and pressure. The timing for power application to devices other than the microprocessor 140 can be calculated from an internal microprocessor clock and the periodicity of the functionality can be pre-determined and defined by the firmware executed by the microprocessor 140. The tag can then transmit such sensed data either thru the optical or ultrasonic or RF modes of operation.

The time reference crystal 150 can be incorporated for applications in which the tag is utilized as a data logging device. In this application the real time of a recorded event, such as a sensor parameter or an optical communication, can be stored in memory and the actual time of event occurrence determined from the downloaded data. That is, an accurate time can be associated with events and communication. This capability allows the event (sensed data, optical communication, etc.) to be associated with the "real time" (date and GMT referenced). It should be noted that this time reference crystal 150 is not required for correcting the timing of data bit pulses that are used to convey data to and from the tag. These temperature induced errors can be handled by the algorithms described below.

As indicated above, the exemplary tag illustrated in FIG. 3 includes several optional elements. By utilizing the various elements, as appropriate, and software stored in memory internal to the microprocessor 140 or in the external memory 110 and executed by the microprocessor 140, the tag can operate in a variety of modes and perform a variety of functions. For example, the tag can have a periodic RF transmit only mode. In this mode the tag can transmit the tag's ID value on a periodic basis. This functionality permits auto tracking of the tag.

In another example, the tag may have an optical communication mode. In this mode the tag can transmit RF automatically in a beacon mode, or upon receipt of the optical trigger signal to transit upon command. The optical communication mode provides the ability to transmit the ID value of the optical trigger or reader unit to the tag which in turn transmits the tag embedded ID value as well as the trigger ID, thus establishing the identification of the unique trigger used to contact the tag. Data can be transmitted to the tag for storage and data can be commanded to be transmitted from the tag via the RF mode or optical mode from this optical input communication mode of operation.

Figure 4:
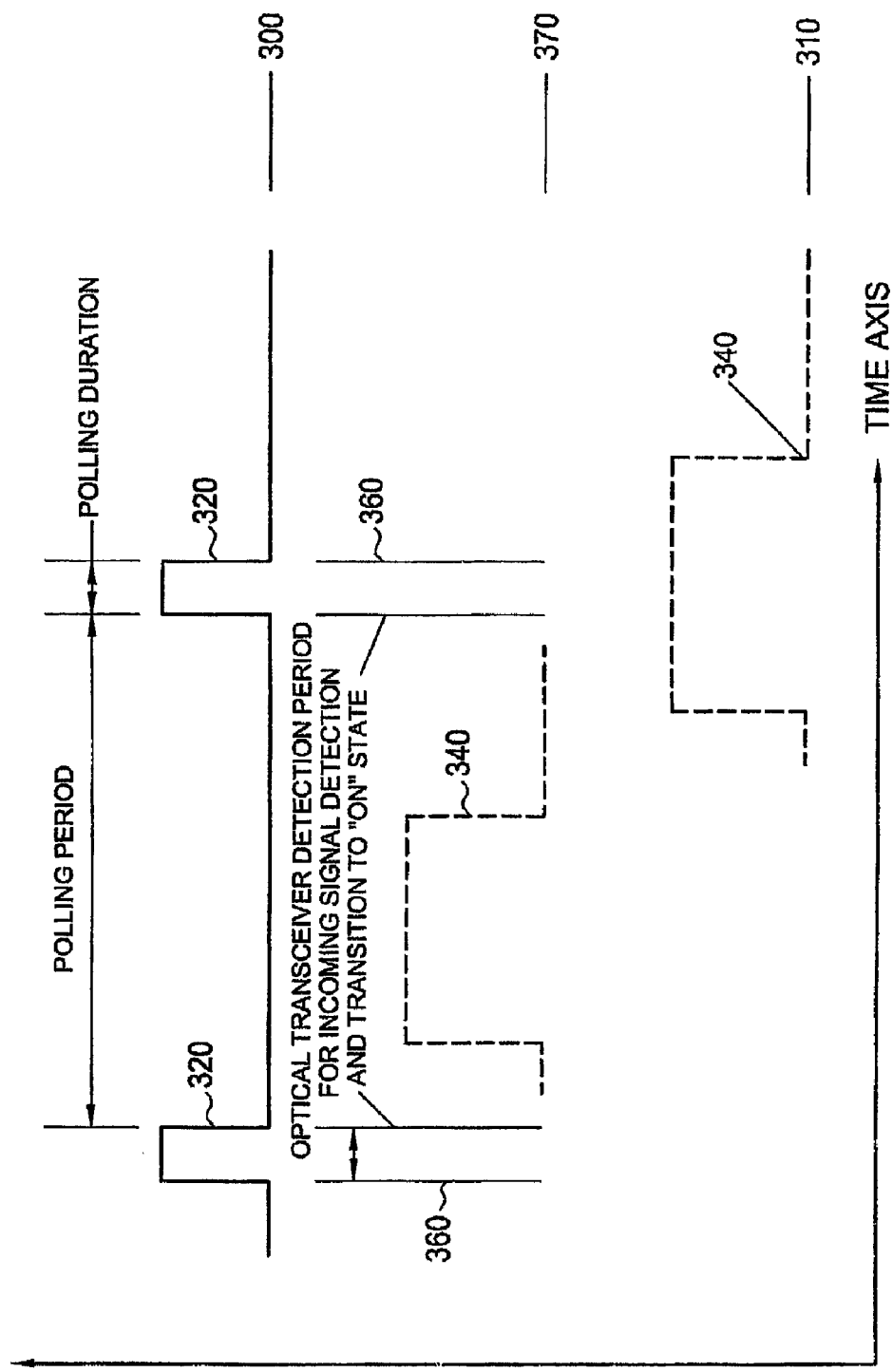
FIG. 4 illustrates, according to one embodiment of the present invention, the relationship between polling periods, polling durations, transition from the polling mode to the data communication mode of operation and shows the approximate relationship of the incoming infra-red "wake-up" signals with respect to the polling duration and to the receive period of the infra-red transceiver.

FIG. 4 illustrates, according to one embodiment of the present invention, the relationship between polling periods, polling durations, transition from the polling mode to the data communication mode of operation and shows the approximate relationship of the incoming infra-red "wake-up" signals with respect to the polling duration and to the receive period of the infra-red transceiver. In this example, line 300 illustrates the repetitive polling that is conducted by the tag. According to one embodiment of the present invention, the timer in the microprocessor 140 calculates the polling period, wakes up the optical receiver 220, for the polling duration period 320, and determines if a valid communication signal is present. If no such signal is present 360, the microprocessor may return to the sleep mode until it reaches the subsequent polling period at which time it can repeat the polling duration functionality.

In line 370 of FIG. 4, the functionality wherein the microprocessor "wakes up" and looks for an incoming optical signal 340 is shown according to one embodiment of the present invention. The incoming pulse 340 is shown occurring outside of the polling period time window 360. It is not necessary that these two events 320 and 340 align leading edge to leading edge. The incoming pulse 340 is detected during a portion of the polling period 320. This is illustrated in line 310 where the duration of the incoming pulse train 340 is present during the detection period 360. In this mode of operation, according to one embodiment of the present invention, when the microprocessor detects an incoming optical signal, the microprocessor can supply full power to all or some of the circuit elements and receive the incoming encoded optical signal (pulse train). In the exemplary implementation, the wake-up pulse train is present for two or more polling duration events. The timing and duration of each event are determined by desired system response times. The values can be selected based on total system responses.

Figure 5:
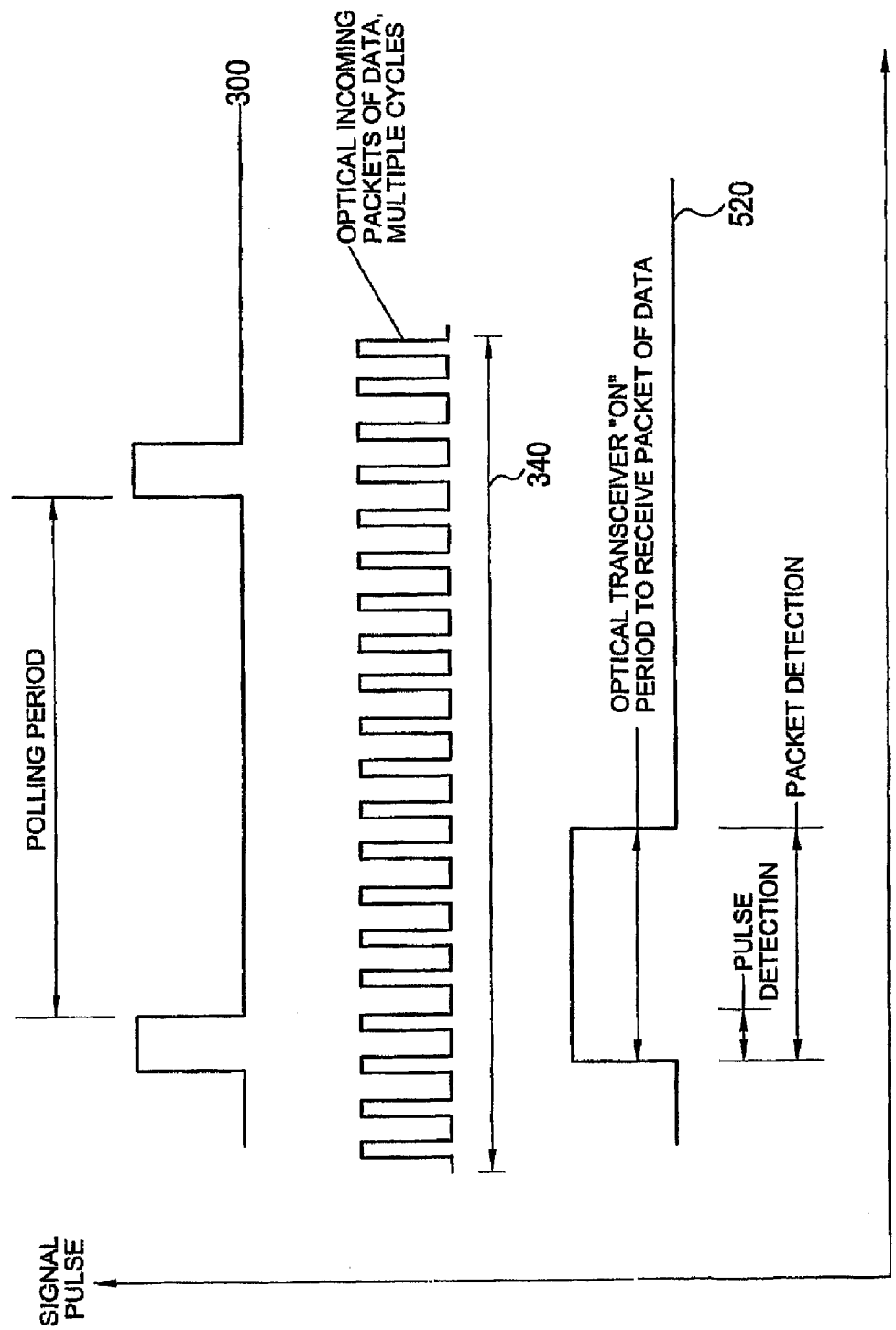
FIG. 5 illustrates, according to one embodiment of the present invention, the relationship between polling periods, polling durations, transition from the polling mode to the data communication mode of operation and shows the approximate relationship of the incoming infra-red "wake-up" signals with respect to the polling duration and to the receive period of the infra-red transceiver.

FIG. 5 illustrates, according to one embodiment of the present invention, the relationship between polling periods, polling durations, transition from the polling mode to the data communication mode of operation and shows the approximate relationship of the incoming infra-red "wake-up" signals with respect to the polling duration and to the receive period of the infra-red transceiver. In this example, the signal detection repetitive polling periods 300 from FIG. 4 are illustrated. The incoming optical signal packets 340 are illustrated as a series of digital pulses. When a "wake-up" packet is transmitted, the packet can be repeated to ensure that it overlaps polling durations of the tag and is sufficiently long that the tag's microprocessor can detect it. Any pulse train of the proper timing is sufficient to cause the microprocessor to process an incoming signal, thus enabling the wake up function to occur even if the incoming signals did not represent the beginning of the data packet stream as illustrated in FIG. 5. At line 520 the presence of a packet is detected within the polling duration and the microprocessor, being fully "on", decodes the remaining pulse train as an indication to stay fully energized to detect the subsequent embedded data.

Figure 6:
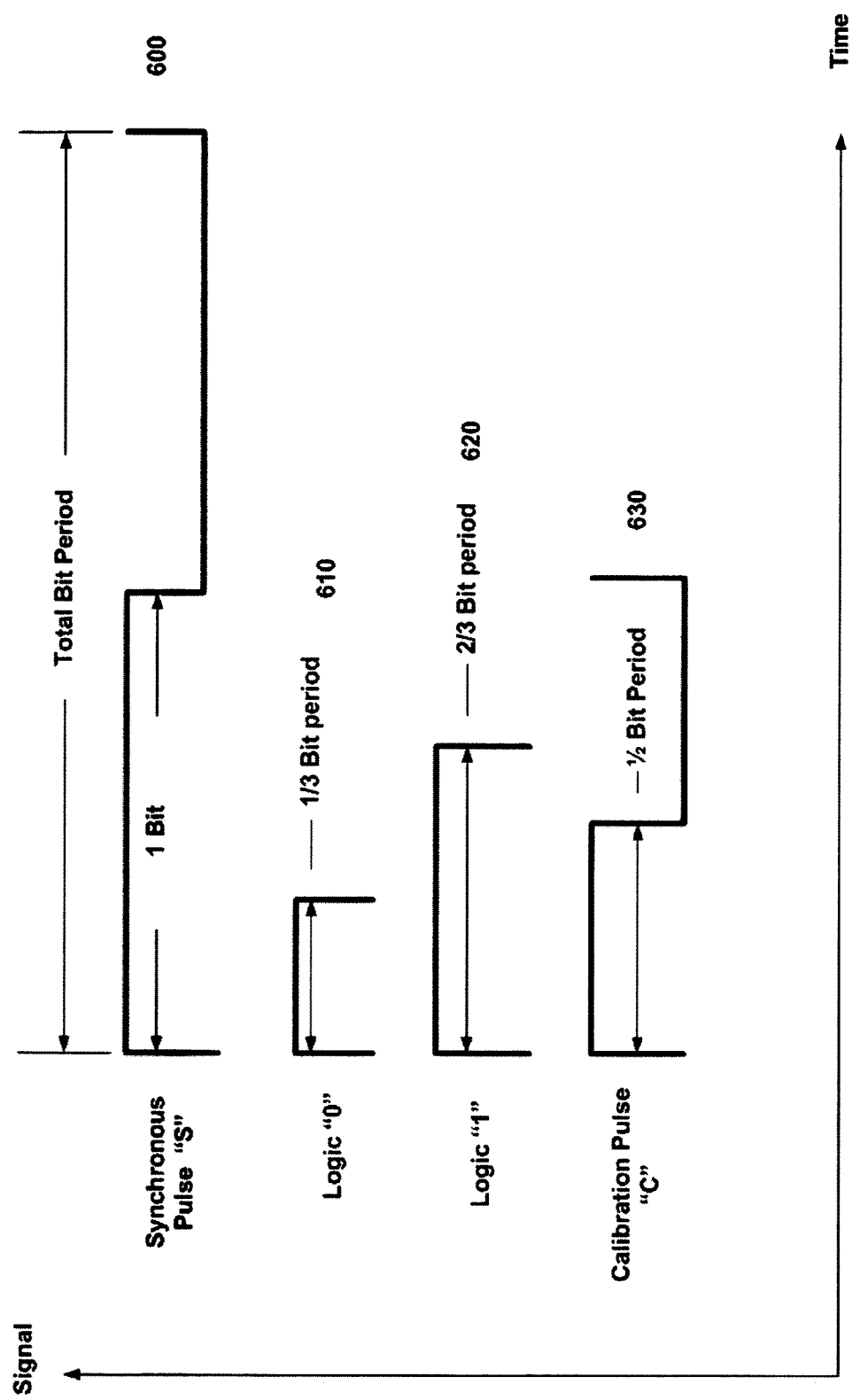
FIG. 6 illustrates the bit period for the calibration, zero, one, and synchronous bits according to one embodiment of the present invention.

FIG. 6 illustrates the bit period for the calibration, zero, one and synchronous bits and timing relationships between the various types of pulses according to one embodiment of the present invention. In this example, the four logic states are "synchronous", "calibration", "logic 1" and "logic 0". The distinguishing characteristic of these states can be the duration of the on and off, i.e., high and low, pulses. According to one embodiment of the present invention, the synchronous bit can be a combination of high and low states as shown in line 600. According to one embodiment of the present invention, the "Logic 0" state 610 can be defined as a pulse of approximately ⅓ the total duration of the sync pulse at the "on" state and ⅔ of the "off" state. According to one embodiment of the present invention, a logic 1 state 620 can be defined as ⅔ of the sync pulse duration at the "on" state and ⅓ sync pulse duration at the "off" state as shown in line 620 of FIG. 6. According to one embodiment of the present invention, a calibration pulse 630, from which all subsequent timing may be based, can be ½ synchronous pulse duration at the "on" state and ½ at the "off" state as shown in line 630 of FIG. 6. According to one embodiment of the present invention, a synchronous state can be defined as an "on" condition for a period of 2 times the total pulse duration of the calibration pulse followed by an "off" condition of 2 times the total pulse duration of the above calibration pulse.

Figure 7:
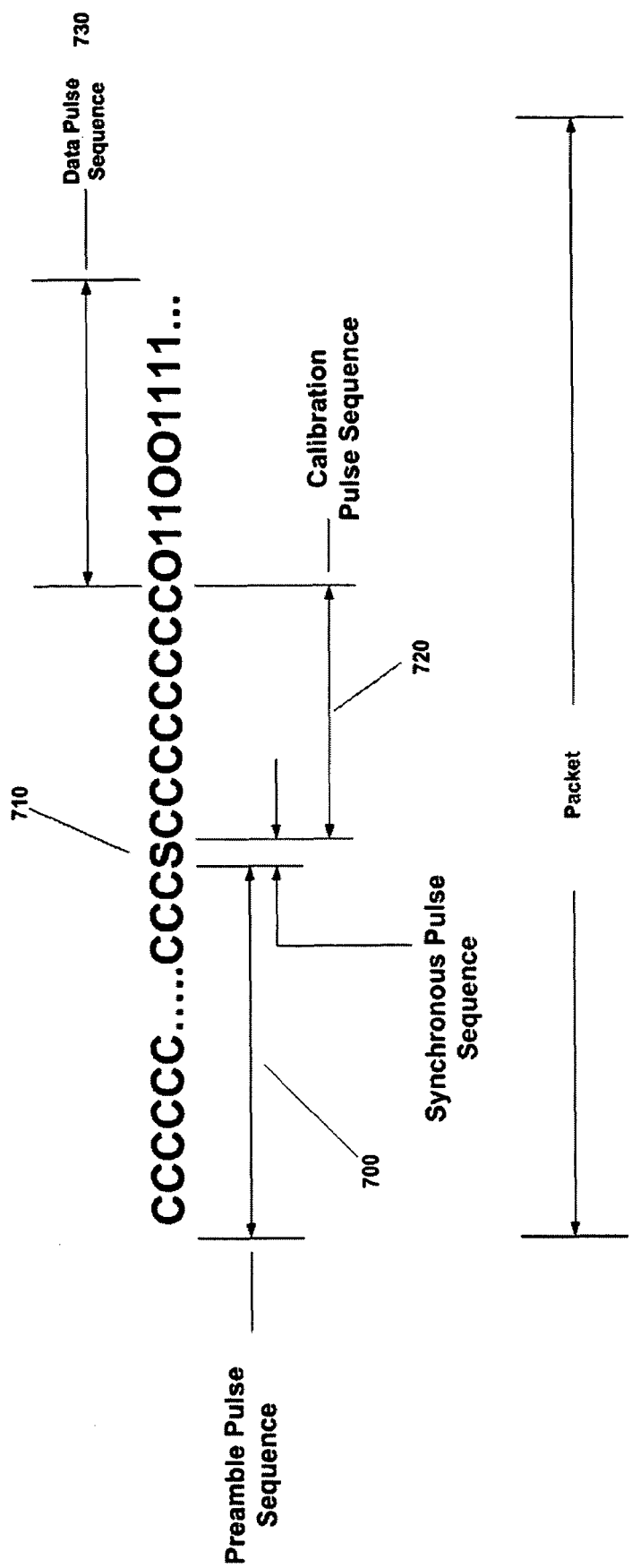
FIG. 7 illustrates the relationship between bit periods transmitted in communication packets according to one embodiment of the present invention.

According to one embodiment of the present invention, the packet or stream of bit periods transmitted by the secondary optical triggering device can be comprised of a series of these bit periods. While not limited to any specific number, an exemplary bit sequence can be comprised of a series of calibration bits followed by a synchronous bit period followed by eight additional calibration bit periods followed by a data sequence as determined by the data or command being transmitted. A packet can consists of a series of pulses the respective characteristics of which are illustrated in FIG. 7. According to one embodiment of the present invention, the preamble portion 700 can be the portion of a packet used by the tag to detect the presence of an incoming optical signal. This preamble pulse train can be a series of on and off (one and zero) pulses that are generated by the trigger using a time dependant time reference. Embedded within this packet may be a synchronous pulse train 710 that can be detected by the microprocessor of the tag and used to indicate pulse train sequencing. The tag's microprocessor, having detected the synchronous signal, can utilizes the next portion of the packet 720 to accurately detect and record the timing of the leading edges of the calibration pulses 720. The microprocessor may store this timing and use the timing information to decode the final pulse sequence 730, that of an embedded command or transfer of data. Once the tag is fully powered it can decode data or commands that are being transmitted by the triggering device. In this mode the data packets may be of the nature illustrated in FIG. 6.

According to one embodiment of the present invention, these data or command packets may be repeated three or more times to ensure that the microprocessor of the tag has received the entire packet. Data and command packets can be transmitted with a cyclic redundancy check (CRC) to validate the integrity of the data or command. For mode #1, as described above, the incoming signal would be used to calculate a time for functioning the RF transmit. In other modes either commands or data transfers would take place.

Another aspect of the present invention includes a method of eliminating or reducing the impact of temperature induced variations in electronic components which in turn affect the timing and performance of the data transfer signals. The method utilizes a pre-cursor set of signal pulses the timing of which can be measured to determine the temperature induced effects. Once determined, the timing of the pulses can be applied to all of the signals and the overall performance of the data transfer can be improved.

Therefore, according to one embodiment of the present invention, a tag can transmit data without the use of a precise time reference resonator element to maintain the accurate timing of data bits. This attribute is correlated to the ability to ensure a detection of incoming data during the polling duration period. In order to accomplish this functionality, a ratio of "on", or 1 states, to the "off", or 0 pulse states for bit periods can be used. Four different logic states are encoded in this manner. FIG. 6 illustrates the pulse ratios for these four states.

This sequence is shown in FIG. 7. In this example, the preamble serves to stabilize the tag hardware by enabling full processor power to all of the microprocessor elements and the optical or ultrasonic transceiver to be applied and the parts to reach an equilibrium state prior to the following sequences which do transfer commands and data. At the completion of the calibration bit ("C" bit) period sequence, a synchronous bit ("S" bit) period may be transmitted. This "S" bit sequence indicates to the microprocessor that the next fixed sequence is a calibration sequence.

According to one embodiment of the present invention, the calibration sequence that follows the synchronous bit period can be comprised of multiple pulses to again stabilize the functionality. This sequence allows the elimination of the accurate timing reference crystal that other RF systems use to eliminate temperature induced drift or inaccuracies. In an exemplary embodiment, this calibration sequence can be a fixed number of bits with the last bit analyzed by the microprocessor to determine the total bit period.

Figure 8:
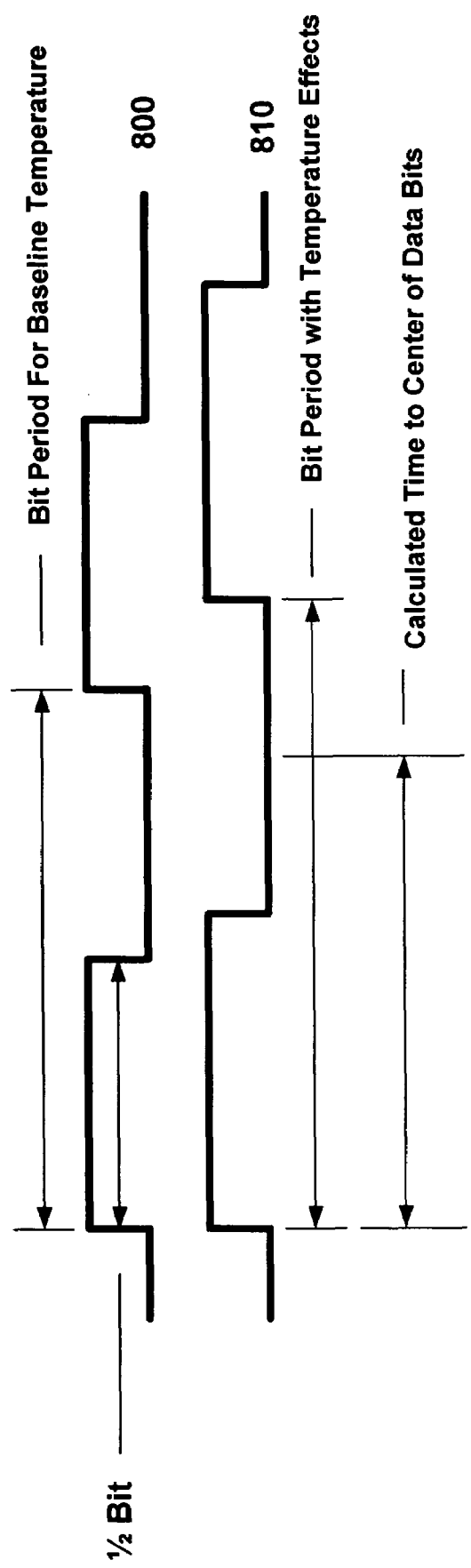
FIG. 8 illustrates the relationship between bit periods when temperature variation adjustments are incorporated according to one embodiment of the present invention.

According to one embodiment of the present invention, the microprocessor determines the time between the two leading edges of the last calibration pulse. This determination can be aided by the choice of a ½ "on" and ½ "off" pattern for the calibration pulse described above. The total period of this bit can vary significantly due to the temperature effects on the microprocessor clock which can cause the bit period to change by plus or minus 5% or more. With reference to FIG. 8, line 800 illustrates the normal pulse width associated with a nominal temperature condition. Line 810 illustrates the effects of temperature on the pulse width, i.e. either shortening or lengthening the pulse. Normally this effect would obviate the ability to decode subsequent data trains since most processing algorithms use the correlation between leading edges as the detection of a bit sequence (timing). This shifting of leading edges due to temperature drift would not allow accurate data decoding. However, by measuring the time (length) of a calibration bit, the timing associated with all of the data bits can be determined. The effects of temperature are not manifested during a short time duration such as that required to transmit data. By determining the center of ½ of a calibration pulse width, as shown in FIG. 8 line 810 these variations due to temperature can be determined. Since the pulse widths are temperature invariant over the time period of signal and data transfer, the microprocessor can establish the timing associated with the pulse train and calculate subsequent bit patterns. The determination of whether the bit pulse is either a "1" or a "0" state condition as determined by analyzing the 0 or 1 state condition associated with each data bit based on the timing derived for ½ of the calibration bits, i.e. by analyzing each 0 or 1 bit at the mid point of a calibration pulse the logic state of 1 or 0 is readily and accurately determined. This allows accurate data transfer in the presence of temper-ature induced timing variations without the incorporation of a separate timing reference resonator (crystal) in the circuit.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A radio frequency identification and autonomous tracking system comprising:
    a) an active, dual-mode radio frequency identification tag having a primary and a secondary communication mode, said primary communication mode comprising a radio frequency transmitter and said secondary communication mode comprising an optical receiver;
    b) a reader communicatively coupled with and adapted with a radio frequency receiver to receive signals representative of information from the radio frequency identification tag via the radio frequency transmitter of the radio frequency identification tag;
    c) a trigger, locally positioned with respect to said tag, communicatively coupled with and adapted with an optical transmitter to send information to the radio frequency identification tag via the secondary mode optical receiver of the radio frequency identification tag; and d) said tag is configured for local triggering by a secondary mode communication signal from said trigger to cause the tag to transmit information between said tag and said reader via said radio frequency primary communication mode.

2. The radio frequency identification system of claim 1, wherein the radio frequency identification tag further comprises an optical transmitter and the trigger further comprises an optical receiver coupled with and adapted to receive information from the radio frequency identification tag via the optical transmitter of the radio frequency identification tag.

3. The radio frequency identification system of claim 2, wherein the radio frequency identification tag is adapted to transmit signals representing information, data, sensor data, tag identification, trigger identification, and combinations thereof, to the trigger via the optical transmitter in response to receiving a signal from the trigger via the optical receiver.

4. The radio frequency identification system of claim 3 wherein the reader includes an optical receiver, and said radio frequency identification tag is adapted to transmit said signals to the reader via the secondary communication mode optical transmitter in response to receiving a secondary communication mode command from the trigger.

5. The radio frequency identification system of claim 3, wherein the reader includes an optical receiver, and said radio frequency identification tag is adapted to transmit a secondary communication mode periodic beacon to the reader via the optical transmitter of said tag in response to receiving a command from the trigger.

6. The radio frequency identification system of claim 3, wherein the reader includes an optical receiver, and said radio frequency identification tag is adapted to transmit sensor data to the reader via the optical transmitter in response to receiving a command from the trigger.

7. The radio frequency identification system of claim 1, wherein in response to said local triggering, the radio frequency identification tag is adapted to transmit signals representing information, data, sensor data, tag identification, trigger identification, and combinations thereof, to the reader via the radio frequency transmitter the tag in response to receiving a secondary, optical, communication signal from the trigger via the optical receiver of the tag.

8. The radio frequency identification system of claim 7 wherein the radio frequency identification tag is adapted to transmit tag identification information to the reader via the radio frequency transmitter in response to receiving a command from the trigger.

9. The radio frequency identification system of claim 7 wherein the radio frequency identification tag is adapted to transmit a periodic beacon to the reader via the radio frequency transmitter in response to receiving a command from the trigger.

10. The radio frequency identification system of claim 7, wherein the radio frequency identification tag is adapted to transmit sensor data to the reader via the radio frequency transmitter in response to receiving a command from the trigger.

11. An active, dual mode radio frequency identification tag for a radio frequency identification and autonomous tracking system comprising:
 a) a primary mode of communication to a reader of said system having a radio frequency receiver, said primary communication mode including a radio frequency transmitter in said tag adapted to transmit information to said radio frequency reader of said system;
 b) a secondary mode of communication with a trigger positioned locally with respect to said tag, said secondary communication mode including an optical receiver in said tag adapted to receive information from said optical trigger of said system; and
 c) said tag is configured for local triggering by a secondary mode communication signal from said trigger to cause the tag to transmit information between said tag and said reader via said radio frequency primary communication mode.

12. The radio frequency identification tag of claim 11, wherein the radio frequency identification tag further comprises an optical transmitter adapted to send information to at least one of the trigger and the reader of the radio frequency identification system.

13. The radio frequency identification system of claim 12, wherein the radio frequency identification tag is adapted to transmit signals representing information, data, sensor data, tag identification information, trigger identification information, and combinations thereof, to the trigger or the reader via the optical transmitter of the tag in response to receiving a secondary communication mode signal from the trigger via the optical receiver of the tag.

14. The radio frequency identification tag of claim 11, wherein the radio frequency identification tag is adapted to transmit signals representing information, data, sensor data, tag identification information, trigger identification information, and combinations thereof, to the reader via the radio frequency transmitter of the tag in response to receiving a secondary communication mode signal from the trigger via the optical receiver of the tag.

15. The radio frequency identification tag of claim 14, which is adapted to transmit a periodic beacon to the reader via the radio frequency transmitter in response to receiving a command from the trigger.

16. A method of communicating with a radio frequency identification tag in a radio frequency identification and tracking system comprising a plurality of tags, and at least one other, separate device having trigger functionality, the method comprising the steps of:
 a) providing an active, bimodal radio frequency tag having a primary, radio frequency, mode of communication and a secondary, optical or ultrasonic, mode of communication;
 b) configuring said tag to be triggered by a secondary, optical or ultrasonic, mode of communication signal from said trigger of said radio frequency identification system, to cause said tag to transmit a selected signal via said primary, radio frequency, mode of communication upon receipt by said tag of said secondary mode of communication signal;
 c) transmitting a secondary, optical or ultrasonic, mode of communication signal from said trigger, locally positioned with respect to said tag; and
 d) receiving said selected signal transmitted from the radio frequency identification tag via said primary, radio frequency, mode of communication in response to the trigger signal.

17. The method of claim 16, wherein said selected signal from said tag is received by a reader, and said selected signal from said tag comprises information, data, sensor data, tag identification information, trigger identification information, and combinations thereof.

18. The method of claim 16, wherein said step of configuring said tag includes causing said tag to transmit signals to a reader, or a trigger via the secondary, optical or ultrasonic, mode of communication.

19. The method of claim 16, wherein said selected signal from the radio frequency identification tag comprises tag identification information and trigger identification information so that said tag can be associated as being within the field of view of said trigger.

20. The method of claim 16, further comprising the steps of:
   e) transmitting from said tag, in advance of transmitting information-containing signals, a calibration set of signal pulses to the reader via said primary, radio frequency, mode of communication;
   f) measuring the timing of the calibration set of signal pulses to determine an amount of temperature drift in the radio frequency identification tag information-containing signals; and
   g) applying the timing of the calibration set of signal pulses to subsequent information-containing signals from the radio frequency identification tag to obtain information from said signals.

21. The method of claim 20, wherein said step of measuring the timing of said calibration set of signal pulses comprises measuring the center of one-half calibration pulse width to establish timing associated with a subsequent pulse train.

22. The method of claim 16, wherein said trigger transmits a command signal to said tag to transmit a periodic beacon to a reader via the primary, radio frequency, mode of communication, so that said tag-transmitted signal permits discrimination of the transmitting tag from among said plurality of tags within said field of view.

* * * * *